United States Patent [19]
McCullough et al.

[11] Patent Number: 4,830,938
[45] Date of Patent: May 16, 1989

[54] SECONDARY BATTERY

[75] Inventors: Frances P. McCullough, Lake Jackson, Tex.; Charles A. Levine, Clayton, Calif.; Roy V. Snelgrove, Freeport, Tex.

[73] Assignee: The Dow Chemical Company, Midland, Mich.

[21] Appl. No.: 170,678

[22] Filed: Mar. 17, 1988

Related U.S. Application Data

[63] Continuation of Ser. No. 741,320, Jun. 4, 1985, abandoned.

[51] Int. Cl.$^4$ .................. H01M 6/42; H01M 6/48
[52] U.S. Cl. .................... 429/149; 429/159; 429/160; 429/210
[58] Field of Search ............... 429/149, 150, 210, 159

[56] References Cited

U.S. PATENT DOCUMENTS 4,275,130 6/1981 Rippel et al. ............. 429/210 X
4,707,423 11/1987 Kawin et al. ............. 429/194 X Primary Examiner—Stephen J. Kalafut
Attorney, Agent, or Firm—John Lezdey

[57] ABSTRACT

In accordance with the present invention an improved secondary battery is disclosed which consists of at least two and preferably three or more cells in series, each intermediate cell containing a pair of shared carbonaceous electrodes, each electrode being a carbonaceous body of a length to be inserted into adjacent cell, forming the positive electrode in one cell and the negative electrode in the adjacent cell. Each terminal cell in said series having a second electrode of a carbonaceous material providing a connection to complete the flow of stored energy out of and charge energy into said cell series. Each cell has a formaninous separator between each pair of electrodes in said cell to maintain its electrodes in spaced apart relationship. Each cell is a container or compartment of a container and the common electrode connects each cell to the adjacent cell. Each cell is provided with an ionizable salt in a non-aqueous fluid.

6 Claims, 1 Drawing Sheet

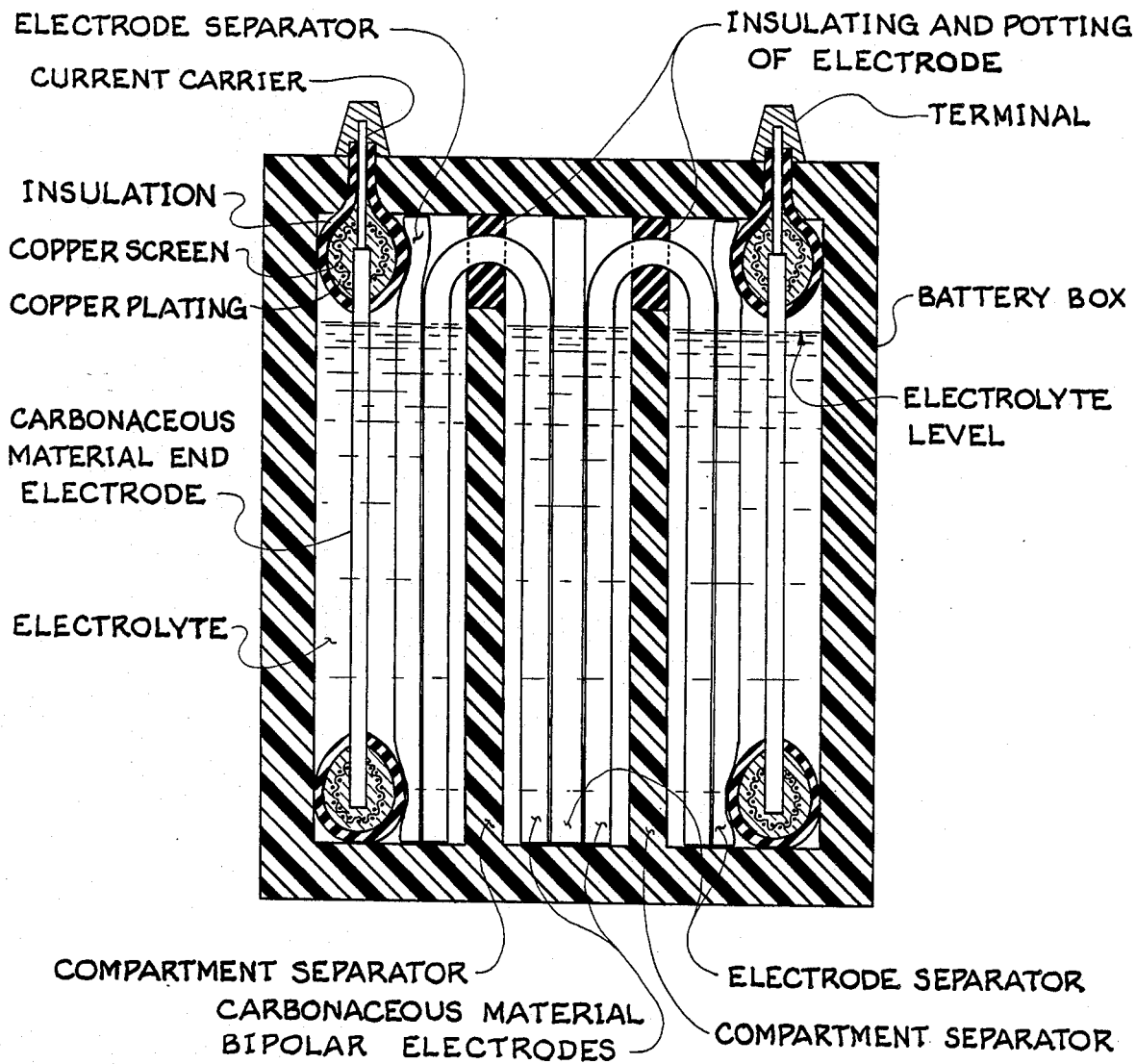

SECONDARY BATTERY

This is a X continuation, continuation-in-part, division, of application Ser. No. 741,320, filed June 4, 1985, now abandoned.

BRIEF DESCRIPTION OF THE INVENTION

In accordance with the present invention an improved secondary battery is disclosed which consists of at least two and preferably three or more cells in series, each intermediate cell containing a pair of shared carbonaceous electrodes, each electrode being a carbonaceous body of a length to be inserted into adjacent cell, forming the positive electrode in one cell and the negative electrode in the adjacent cell. Each terminal cell in said series having a second electrode of a carbonaceous material providing a connection to complete the flow of stored energy out of and charge energy into said cell series. Each cell has a formaninous separator between each pair of electrodes in said cell to maintain its electrodes in spaced apart relationship. Each cell is a container or compartment of a container and the common electrode connects each cell to the adjacent cell. Each cell is provided with an ionizable salt in a non-aqueous fluid.

Each electrode is potted into a seal section covering the cells to encase the common electrodes and seal each cell from its adjacent cell and to prevent wicking of electrolyte from one cell to the other through the common electrode. Of course the terminal electrode in each end cell is potted in a similar manner with a connector to the outside to carry current to and from the cells. Further, only the terminal electrodes require current collector frames since each other electrode is a shared electrode and thus a current carrier per se from one compartment to the other.

In addition it is to be understood that inductive coils may be used to charge/discharge the battery when no external connections are desired.

The Drawings

FIG. 1 illustrates in cross section, the cell in its most preferred embodiment.

Detailed Description of the Invention

In accordance with a preferred embodiment of the present invention there is provided a case, which is impervious to the passage of gas therethrough, including particularly, water vapor. The case has a lower body member, an upper body member, and two internal cell separators defining within said case, a series of three cells, all of which are preferably composed of the same impervious material. However, separator(s), may be of a lesser impervious nature, requiring only that ions cannot pass therethrough. The internals of the cells, are pairs of electrodes made from a carbonacious material having certain properties defined hereinafter and more fully defined in our copending application Ser. Nos. 558239, now abandoned, entitled Energy Storage Device, filed Dec. 5, 1983 by Francis P. McCullough, Jr., et al. and 678,186, entitled Secondary Electrical Energy Storage Device and Electrode Therefore, filed Dec. 4, 1984, which are incorporated in toto herein. Electrodes 16a and b are of a dimension such that they can be introduced into an adjacent cell in that portion of the adjacent cell having an opposite polarity. Although the electrodes, 16a and b, are shown as a single piece bent to be insertable into adjacent cells it is also to be understood that two electrodes could be connected in a manner to conduct current in the same manner as a single piece would. Further, while each bipolar electrode is shown as a single sheet, film or cloth of the body or case dimensions, the pair of electrodes may be folded with their separator to increase the total electrode area and volume in each cell. Separating the two electrodes in a cell from electrical contact with each other is a foraminous member, 17, which will at least pass ions. Various forms of membrane like material may be employed, e.g. fiberglass mats, polypropylene scrim or film, ion exclusion membranes and the like.

The preferred electrolyte, 18, for such a secondary cell is a mixture of an ionizable salt dissolved in a non aqueous non-conducting liquid or paste. Alternatively, the electrolyte per se may be ionizable to some extent as well as any non conducting solid through which ions will be transported under influence of electrical charge and discharge as more fully explained in copending applications above identified.

Preferably, the electrically conductive carbonaceous material of the electrode should have the following physical property criteria:

(1) A Young's modulus of greater than 1,000,000 psi (6.9 GPa), preferably from 10,000,000 psi (69 GPa) to 55,000,000 psi (380 GPa), especially 20,000,000 to 45,000,000 psi (138 GPa to 311 GPa).

(2) An aspect ratio of greater than 100:1. The aspect ratio is defined herein as the length to diameter l/d ratio of a fibrous or filament strand of the carbonaceous material or as the length to depth ratio when the carbonaceous material is formed as a planar sheet.

(3) The structural and mechanical integrity of the carbonaceous material in whatever fabricated assembly form it may be (woven, knit or non-woven from continuous filament or staple fibers or a film) must be such that it does not require the presence of a support such as a pressure plate (face films or mesh) to maintain the carbonaceous material in the desired sheet or plate like shapes throughout at least 100 charge/discharge cycles.

(4) A surface area with respect to fiberous materials of at least 0.1 $m^2/g$ but less than one associates with activated absorptive carbon, suitable less than 50 $m^2/g$, preferably less than 10 $m^2/g$, and especially less than a 5 $m^2/g$.

(5) Sufficient integrity of the form of the carbonaceous material to enable the carbonaceous material to retain its plate or sheet like shape when of a size greater than 1 $in^2$ (6.45 $cm^2$) to greater than 144 $in^2$ (930 $cm^2$) without support, i.e. other than the metallic current collector frame forming the edge portion of the terminal electrode and a plastic coating on the edges of the bipolar electrodes sufficient to prevent the fiber ends from fraying. Suitable plastic materials are polyethylene or Derakane brand curable vinyl ester epoxy resin coating composition. Performance Criteria (6) The carbonaceous material of an electrode should be capable of sustaining more than 100 electrical charge and discharge cycles without any appreciable damage due to flaking of the carbonaceous material. Preferably, no appreciable damage should occur after more than 500 electrical charge and discharge cycles, at a discharge capacity of a greater than 150 coulombs per gram of carbonaceous material of an electrode.

(7) The coulometric (coulombic) efficiency of the carbonaceous material of the electrode should be greater than 70 percent, preferably greater than 80 percent and most preferably greater than about 90 percent.

(8) The carbonaceous material of the electrode should be capable of sustaining deep electrical discharges of greater than 70 percent of its electrical charge capacity for at least 100 cycles of electrical charge and discharge, and preferably greater than 80% for more than 500 electrical charge and discharge cycles.

(9) A secondary electrical energy storage device in which the electrode of this invention is employed should be substantially free of water to the extent of less than 100 ppm. Preferably, the water content should be less than 20 ppm and most preferably less than 10 ppm. The device of the invention is capable of operating with water content of up to 300 ppm but will have a somewhat reduced cycle life. Further, it is to be understood that should the water content level become onorous, the device may be disassembled, dried and reassembled in such dry state without substantial damage to its continued operability.

Accordingly, the carbonaceous material of an electrode having the physical properties hereinbefore described preferably should be capable of sustaining electrical discharge and recharge of more than 100 cycles at a discharge capacity of greater than 150 coulombs per gram of carbonaceous material in an electrode and at a coulometric efficiency of greater than 70% without any substantial irreversible change in dimensions (dimensional change of less than about 5%.

Usually, the carbonaceous material will be obtained by heating a precursor material to a temperature above 850° C. until electrically conductive. Carbonaceous precursor starting materials capable of forming the electrically conductive oriented carbonaceous material portion of the electrode may be formed from pitch (petroleum or coal tar), polyacetylene, polyacrylonitrile, polyphenylene, SARA (Trade Mark), and the like. The carbonaceous precursor starting material should have some degree of skeletal orientation, i.e., many of these materials either have substantial concentrations of oriented benzenoid structural moieties or moieties which are capable of conversion, on heating, to benzenoid or equivalent skeletal orientation at or near the surface because of the skeletal orientation of the starting material.

Exemplary of preferred carbonaceous precursor materials which exhibit such skeletal orientation on heating are assemblies of multi or monofilament strands or fibers prepared from petroleum pitch or polyacrylonitrile. Such multi or monofilament strands or fibers are readily converted into threads or yarns which can then be fabricated into a cloth-like product. One technique for producing suitable monofilament fibers is disclosed in U.S. Pat. No. 4,005,183 where the fibers are made into a yarn which is then woven into a cloth. The cloth is then subjected to a temperature, usually above 1000° C., sufficient to carbonize the cloth to make the carbonaceous material electrically conductive and so as to provide the material with the physical property characteristics hereinbefore described under paragraphs (1) through (6). Such a cloth, in conjunction with an electron collector, is particularly suitable for use as the terminal electrodes in the bipolar secondary electrical energy storage device of the present invention. The bipolar electrode may require a size or coating on these edges to prevent fraying during assembly.

Advantageously, the carbonaceous precursor material is in the form of a continuous filament fiber, thread(s) constituted of continuous filament(s) or non-continuous fiber tow (yarn) which can be made into assemblies such as woven, non-woven, knitted assemblies, or the staple fibers per se layered to form a cloth, paper-like or felt-like planar member. However, acceptable results are obtained when yarns made from short fibers (about 1 to 10 cm long) are woven or knit into a cloth-like product (provided such short fibers still have, when heat treated, the required physical properties hereinbefore mentioned under (1) through (6)). It is of course to be understood that while it is advantageous to form the precursor material, preferably in a stabilized state (such as is obtained by oxidation), into the desired form (knit, woven or felt) prior to carbonization, such construction may be done after carbonization if the modulus is below about 55,000,000 psi (380 GPa) and preferably below about 39,000,000 psi (269 GPa) for machine fabrication. It is of course to be understood that the carbonaceous material may be formed from a film precursor.

In addition the final form or shape of the carbonaceous material may be produced, e.g. a roll of material, then the material carbonized. This technique is particularly advantageous if a woven, vis-a-vis a knit fabric is to be employed, the latter being more flexible after carbonization than woven material and thus capable of rolling as in a jelly roll.

The degree of carbonization and/or graphitization does not appear to be a controlling factor in the performance of the material as an electrode element in an electrical storage device except that it must be enough to render the material sufficiently electrically conductive and is also enough to provide the aforementioned physical and mechanical properties under the designated use conditions. Carbonaceous materials having about 90 percent carbonization, are referred to in the literature as partially carbonized. Carbonaceous materials having from 91 to 98 percent carbonization are referred to in the literature as a carbonized material, while materials having a carbonization of greater than 98 percent are referred to as graphitized. It has surprisingly been found that carbonaceous materials having a degree of carbonization, of from 90 to 99 percent, have failed as an electrode materials unless the carbonaceous material has the required dimensional stability during electrical charge and discharge cycling. For example, RPG graphite and GRAFOIL, while having the requisite degree of carbonization, electrical conductivity and surface area, do not have the required physical properties of Young's Modulus and aspect ratio and thus have failed.

In accordance with the invention, a rechargeable and polarity reversible electrical storage device can be prepared by aligning at least two pair of electrodes each electrode made from the aforedescribed carbonaceous material the intermediate electrodes being bipolar as afore described and shared with adjacent cells and the terminal electrodes preferably being associated with an electron collector (which is electrically conductive), in a housing. The housing has a non conductive interior surface and is impervious to moisture. The electrodes are immersed in a non-aqueous (water being present in an amount of less than about 100 ppm) fluid contained in said housing. The fluid itself must be capable of forming, or contains dissolved therein, at least one ionizable metal salt. Each such electrode is comprised of the carbonaceous heat treated material of the present invention, the terminal electrodes being associated with an electron collector which is preferably insulated against contact with the electrolyte fluid.

In the construction of a preferred embodiment of the secondary electrical energy storage device of the present invention, conventional porous separators of fiberglass, polymeric materials including membranes, or composites of polymeric materials, may be and are preferably employed to separate the positive and negative electrodes from each other. Most preferably a nonwoven porous polypropylene sheet or a functionalized membrane is employed as the separator since it has the desired degree of porosity and yet has a sufficient tortuous path to prevent carbonaceous fibers from penetrating through it, thus preventing electrical shorting. (The porous separators also beneficially act as stiffeners or supports for the electrodes during assembly.)

Energy storage devices which are contained in fluid-tight housings are generally known in the art. Such housings may be suitably employed in the present invention as long as the housing material is preferably electrically non-conductive or at least insulated from contact with one electrode and is impervious to gases and/or moisture (water or water vapor).

The materials found chemically compatible as a housing material include polyvinylchloride, polyethylene, polypropylene, polytrifluoroethylene and related perfluorinated polymers, instant set polymer (ISP), a rapidly solidifying reactive urethane mixture, the aramids, a metal clad with a non-conductive polymeric material such as an epoxy e.g. DER* 331 or with DERAKANE* brand of a curable vinyl ester epoxy resin, ZETABON* brand of a plastic metal plastic laminate and/or glass or a metal oxide, fluoride or the like. Housing materials found not to be suitable in the preferred propylene carbonate system include acrylics, polycarbonate and nylon. Acrylic's craze, polycarbonate's both craze and become extremely brittle, while nylon (except for the aramids) is chemically reactive. *Trademark of The Dow Chemical Company In addition to being compatible, a housing material must also offer an absolute barrier against the transmission of water vapor from the external environment of the housing ($<0.2$ grams of $H_2O/yr/ft^2$ or 0.02 grams of $H_2O/yr/m2$). No presently known thermoplastic material alone offers this absolute barrier against moisture at a thickness which would be useful for a battery housing. At present only metals, for example aluminum or mild settle, offer an absolute barrier against moisture at foil thicknesses. Aluminum foil having a thickness of greater than 0.0015 in. (0.038 mm) has been shown to be essentially impervious to water vapor transmission. It has also been shown that when laminated to other materials, aluminum foil as thin as 0.00035 in. (0.009 mm) can provide adequate protection against water vapor transmission. Suitable housings made of metal-plastic laminate, CED-epoxy-coated metal (cathodic electro deposited), or metal with an internal liner of plastic or glass presently satisfies the requirements for both chemical compatability and moisture barrier ability. Most of the cells and batteries built to date have been tested in either a dry box having a $H_2O$ level of $<5$ ppm, a glass cell or a double walled housing with the space between the walls filled with an activated molecular sieve, e.g. 5A zeolite.

The electrolyte fluid preferably consists of a non-conductive, chemically stable, non-aqueous solvent for ionizable salt or salts wherein the ionizable salt is dissolvent in the solvent. One can employ as the solvent those compounds that are generally known in the art such as, for example, compounds having oxygen, sulfur, and/or nitrogen atoms bound to carbon atoms in an electrochemically non-reactive state. Preferably, one can employ nitriles such as acetonitrile; amides such as dimethyl formamide; ethers, such as tetrahydrofuran; sulfur compounds, such as dimethyl sulfite; and other compounds such as propylene carbonate. It is, of course, to be understood that the solvent itself may be ionizable under conditions of use sufficient to provide the necessary ions in the solvent. Thus, the ionizable salt must be at least partially soluble and ionizable either when it is dissolved and goes into solution into the solvent or upon liquification. While it is to be understood that slightly soluble salts are operable, it will be recognized that the rate of electrical charging and discharging may be adversely affected by the low concentration of such salts in solution.

Ionizable salts which may be employed in the practice of the invention are those taught in the prior art and include salts of the more active metals, such as, for example, the alkali metal salts, preferably lithium, sodium or potassium, or mixtures thereof containing stable anions such as perchlorate ($ClO_4^-$), tetrafluoroborate ($BF_4^-$), hexafluoroarsenate ($AsF_6^-$), hexafluoroantimonate ($SbF_6^-$) or hexafluorophosphate ($PF_6^-$).

The electrolyte (solvent and salt) must be substantially water-free, that is, it should contain less than 100 ppm of water, preferably less than 20 ppm of water and most preferably less than 10 ppm of water. Of course, the electrolyte can be made up having more than the desired amount of water and dryed as for example, over activated zeolite 5A molecular sieves. Such agents may also be combined into the finished battery to ensure that the low level water requirement is maintained. The electrolyte should also be such as to permit ions (anions and cations) of the ionizable salt to move freely through the solvent as the electrical potential of charge and discharge move the ions to and from their respective poles (electrodes).

The terminal electrodes, when constructed as a cloth or sheet, includes an electron collector conductively associated with at least one of the edges of the carbonaceous fibers or sheet. The edge(s) is preferably further protected by a material to insulate the collector and to substantially protect the electron collector from contact with the fluid and its electrolyte ions. The protective material must, of course, be unaffected by the fluid or the electrolyte ions.

The current collector intimately contacts the carbonaceous material of the electrode at least along one edge and preferably on all four edges thereof when the carbonaceous material is in the form of an assembly such as a planar cloth, sheet or felt. It is also envisioned that the electrode may be constructed in other shapes such as in the form of a cylindrical or tubular bundle of fibers, threads or yarns in which the ends of the bundle are provided with a current collector. It is also apparent that an electrode in the form of a planar body of cloth, sheet or felt can be rolled up with a porous separator between the layers of the carbonaceous material, and with the opposed edges of the rolled up material, connected to a current collector. While copper metal has been used as a current collector, any electro-conductive metal or alloy may be employed, such as, for example, silver, gold, platinum, cobalt, palladium, and alloys thereof. Likewise, while electrodeposition has been used in bonding a metal or metal alloy to the carbonaceous material, other coating techniques (including melt applications) or electroless deposition methods may be employed as long as the edges or ends of the electrode, including a majority of the fiber ends at the edges of the carbonaceous material are wetted by the metal to an extent sufficient to provide a substantially low-resistant electrical contact with current path.

Collectors made from a non-noble metal, such as copper, nickel, silver or alloys of such metals, must be protected from the electrolyte and therefore are preferably coated with a synthetic resinous material or an oxide, fluoride or the like which will not be attacked by the electrolyte or undergo any significant degradation at the opening conditions of a cell.

In the present cell it is also possible to use inductive coils imbedded in the case material connected to the end electrodes.

An additional advantage of the present cell design is that the cell is reversible, that is to say, the cell may be connected in one manner positive-negative and on negative can be reversed, negative-positive without damage to the electrodes.

Example 1

In a representative example a 1 inch by 5 inch strip of Panex cloth (PWB-6) was sealed within a "Cellgard" pocket. A pair of 2 inch square panels of Panex cloth were copper plated about each edge, a copper mesh screen was pressed over the copper plate on all four sides of each panel and the resulting structure again electroplated to embed the mesh in a copper plate coating. The copper plating was then coated with a curable epoxy-vinyl ester resin (Derakane) and cured. Each of the panels (electrodes) was placed in a polyethylene bag, the 5 inch strip was doubled over and an end placed in each bag. A 15% solution of $LiClO_4$ in propylene carbonate was added to each bag. The assembly was done in a dry box with all components having been dried prior to assembly. The entire assembly was left in the dry box over night, then placed on charge at a voltage of 10.5 volts. The charge was 28.246 coulombs. Upon discharge the voltage was discharged down to 0.10 V through a 100 ohm resistance during a 45 minute period yielding 15 coulombs. This represents a 53% efficiency. Additional cycles were run. The results are set forth below:

The low coulometric efficiency was attributed to contact of the electrolyte of one cell to another via wicking over the bipolar fabric electrode connection between the two cells. This was prevented in later batteries by potting with a bead of Derakane the cloth connection of the bipolar electrodes going two adjacent cells.

Example 2

A bipolar cell was constructed as shown in FIG. 1 except four compartments were employed.

The end electrodes having a copper current collector protected by Derakane coating were 4"×4.5" active/carbonaceous material in contact with the electrolyte. The three center electrodes were made from pieces of graphite cloth 4"×10", enclosed in glass cloth bags folded to be insertable into adjacent. Each pair of electrodes was inserted in a polyethylene bag which holds electrolyte. The thickness of the entire assembly was 1.8 cm or 0.75 inches.

Thirty $cm^3$ of a 15% $LiClO_4$ in propylene carbonate solution was added to each bag. This amount of electrolyte is equivalent to 1140 ma-hour of capacity. The end electrodes weighed 5.5 grams each, which, at a capacity of 250 coulombs per gram equals a capacity of 382 ma-hours.

This battery of 4 bipolar cells was charged and discharged repeatedly. Charging was at 18.2 volts. Discharge was to terminal voltages as low as 7.6 volts. Battery resistance was about 12 ohms. Current densities as calculated for a 4"×4" end electrode were varied from 0.6 to 2.3 ma per $cm_2$.

Example 3

A bipolar cell was constructed as in example #2 except that Celgard polymer separator was used instead of glass cloth. Total thickness across all four cells was approx. 1.0 cm. This cell was charged and discharged repeatedly. Charging was done at 20.1 volts. Open circuit voltage on full charge was 19.4 volts. Battery resistance is a minimum at full charge and was approximately 5 ohms. Discharge was to an open circuit voltage of about 10 volts. This cell used a Derakane brand head on the area of electrode fabric of the bipolar constructed electrodes, at the point of junction of the two adjacent cells. The results were improved over example 1, especially in coulometric efficiency which was typically over 85%.

Example 4

A two cell bipolar cell was prepared by inserting into a polypropylene pocket sealed on four edges having a slit cut through one side sheet midway so that when folded in half two pockets are present. Two 5½×5½ pieces Thornel woven cloth were each electroplated on each of the four edges, a five mesh copper wire folded over each so plated edge and the electroplating continued until the mesh was completely inbedded in electroplate copper. A wire was attached to each so prepared electrode and the copper plate and wire were embedded in Derakane brand porting resin. These electrodes were inserted, one in each pocket. A 5"×5" Celgard separator was attached about a five inch square of each end of 12"×6", Panox cloth folded in half by a Derakane porting resin leaving an active area of about 4½×4½ inch and one end of the active area placed in each cell so that the Celgard was between the electrode having the collector frame and the Panex cloth. The Panex cloth had a bead of Derakane brand potting resin at its midpoint.

This assembly was placed in a double wall polyethylene bag then in a plexaglass holder and set in a dry box for 48 hours.

A 15% $LiClO_4$ solution in propylene carbonate which had been dried in a container filled with dry, highly activated 5A molecular seives for 48 hours was used to fill the cells and the battery connected to a charger and alternatively to a variable resistance on discharge.

The above battery was operated over a varying schedule of charge/discharge times, different resistances and discharge cut-off voltages. After 55 cycles with a 2 ohm charge measuring resistance and a 52 ohm discharge load to a 3.43 volt cut off the coulomic efficiency was 85.7%, after 65 cycles the same 2 ohm charge resistance but a 102 ohm discharge resistance a cut off voltage of 3.02 the efficiency was 90%, and after 74 cycles using a 2 ohm charge and 202 ohm discharge resistance on a cut off voltage of 3.7 volts the efficiency was 80.3%. The above data illustrates the uniqueness of the materials and construction to prepare a rechargeable secondary energy storage device.

What is claimed is:

1. A secondary energy storage device comprised of at least a pair of reversible cells sealed in abutting relationship against gas and moisture penetration, each cell being defined by a walled cell compartment, each cell containing, as the active energy storing material, a pair of electrodes of carbonaceous electrically conductive fibrous material, one of which is shared with the adjacent cell and is a continuous shape of said carbonaceous material extending into the cell, each terminal cell, in addition to the shared electrode, has an electrode which has a current collector associated with such terminal electrode and said terminal electrodes of each terminal cell electrically connected to the exterior of said device, the electrodes of each cell being separated from electrical contact with each other electrode of said cell by a foraminous nonconductive material which will pass ions, each cell containing an electrolyte which is an ionizable salt in a non-aqueous non-conductor fluid, said carbonaceous material having a Young's modulus of greater than 1,000,000 psi but less than about 75,000,000 psi.

2. The storage device of claim 1 wherein said carbonaceous material undergoes a physical dimension change of less than 5% during repeated electrical charge and discharge cycling.

3. The storage device of claim 1 wherein said carbonaceous material has a self-contained structural integrity in sizes of 1 to >144 sq, in.

4. The storage device of claim 1 wherein said shared electrode is capable or carrying current from one cell to an adjacent without a current collector frame associated therewith when employed as the electrode in a series of adjacent cells of a battery having but one terminal electrode of similar material provided with a collector plate at each end of the battery.

5. The storage device of claim 1 wherein the fibers of said fibrous carbonaceous material have an aspect ratio or equivalent ratio greater than 100 to 1.

6. The storage device of claim 1 comprising three or more cells, each cell intermediate to said terminal cells having as the active energy storing material, a pair of carbonaceous electrically conductive fibrous material each shared with the adjacent cell as a continuous shape of said carbonaceous material extending through the cell wall into said adjacent cell.

* * * * *

UNITED STATES PATENT AND TRADEMARK OFFICE
CERTIFICATE OF CORRECTION

PATENT NO. : 4,830,938
DATED : May 16, 1989
INVENTOR(S) : McCullough et al.

It is certified that error appears in the above-identified patent and that said Letters Patent is hereby corrected as shown below:

Col. 1, line 4; Change "X continuation, continuation-in-part, division," to --continuation --.

Col. 1, line 48; insert --10,-- between "case," and "which".

Col. 1, line 51; insert --11,-- between "member," and "an".

Col. 1, line 51; insert --12,-- between "member," and "and".

Col. 1, line 52; insert --,13a and b,-- between "separators" and "defining".

Col. 1, line 52; insert --10,-- between "case," and "a".

Col. 1, line 53; insert --14a, b, and c, respectively,-- between "cells," and "all".

Col. 1, line 54; insert --13a and b,-- between "separator(s)," and "may".

Col. 1, line 56; insert --14a-c, -- between "cells," and "are".

Col. 1, line 57; insert --15a and b and 16a and b-- between "electrodes" and "made".

UNITED STATES PATENT AND TRADEMARK OFFICE
CERTIFICATE OF CORRECTION

PATENT NO. : 4,830,938

DATED : May 16, 1989

INVENTOR(S) : McCullough et al.

It is certified that error appears in the above-identified patent and that said Letters Patent is hereby corrected as shown below:

Col. 1, line 59; change "application" to --applications--.

Col. 2, line 58; "Performance Criteria" should be a non-indented heading on a line by itself.

Col. 3, line 39; change "SARA" to --SARAN--.

Col. 5, line 50; change "settle" to --steel--.

Col. 7, line 10; change "with" to --and--.

Col. 7, line 17; change "opening" to --operating--.

UNITED STATES PATENT AND TRADEMARK OFFICE
CERTIFICATE OF CORRECTION

PATENT NO. : 4,830,938
DATED : May 16, 1989
INVENTOR(S) : McCullough et al.

It is certified that error appears in the above-identified patent and that said Letters Patent is hereby corrected as shown below:

Col. 7, line 57; insert table between "cells." on line 56 and "Example 2" on line 58.

TABLE

| Cycle % | Couloumbs Charge | Couloumbs Discharge | Volts | Load (ohms) | eff. charge |
|---|---|---|---|---|---|
| 1 | 28 | | | 1000 | |
|   |    | 15 | | 100 | 53% |
| 2 | 51 | | | 500 | |
|   |    | 35 | | 500 | 70% |
| 3 | 46 | | | 500 | |
|   |    | 33 | | 500 | 73% |
| 4 | 113 | | | 1000 | |
|   |     | 65 | | 1000 | 57% |
| 5 | 80 | | | 500 | |
|   |    | 35 | | 400 | 45 |
| 6 | 76 | | | 150 | |
|   |    | 33 | | 150 | 57% |

UNITED STATES PATENT AND TRADEMARK OFFICE
CERTIFICATE OF CORRECTION

PATENT NO. : 4,830,938

DATED : May 16, 1989

INVENTOR(S) : McCullough et al.

It is certified that error appears in the above-identified patent and that said Letters Patent is hereby corrected as shown below:

Col. 8, line 14; change "$cm_2$" to --$cm^2$--.

Signed and Sealed this

Thirteenth Day of April, 1993

*Attest:*

STEPHEN G. KUNIN

*Attesting Officer*     *Acting Commissioner of Patents and Trademarks*